United States Patent [19]
Goertz

[11] Patent Number: 5,532,734
[45] Date of Patent: Jul. 2, 1996

[54] METHOD OF TRANSMITTING PICTURE DATA FROM A TRANSMITTER TO A SELECTED RECEIVER

[75] Inventor: Hendrik M. H. G. Goertz, Eindhoven, Netherlands

[73] Assignee: U.S. Philips Corporation, New York, N.Y.

[21] Appl. No.: 214,914

[22] Filed: Mar. 17, 1994

[30] Foreign Application Priority Data

Feb. 22, 1994 [EP] European Pat. Off. .............. 94200435

[51] Int. Cl.$^6$ .................................................. H04N 7/10
[52] U.S. Cl. ............................... 348/8; 348/468; 348/564
[58] Field of Search ............................. 348/6, 8, 9, 468, 348/563, 564, 553, 385, 388, 469; H04N 7/10

[56] References Cited

U.S. PATENT DOCUMENTS

| 4,829,569 | 5/1989 | Seth-Smith et al. | 380/20 |
|---|---|---|---|
| 4,912,553 | 3/1990 | Pal et al. | 348/8 |
| 5,231,494 | 7/1993 | Wachob | 348/8 |
| 5,327,230 | 7/1994 | Dockery | 348/8 |

FOREIGN PATENT DOCUMENTS

| 0178804 | 4/1986 | European Pat. Off. . |
|---|---|---|
| 2125595 | 3/1984 | United Kingdom . |
| 8601962 | 3/1986 | WIPO . |
| 9013086 | 11/1990 | WIPO . |
| 9206423 | 4/1992 | WIPO . |

OTHER PUBLICATIONS

SGS Thomson ST7536 Data Sheet.
"An Enhanced Distribution Automation System Based on New Communication Technology at Enel" E. Comellini et al, (no date).
"Distribution Automation System" (no date, no author).

*Primary Examiner*—Victor R. Kostak
*Attorney, Agent, or Firm*—Edward W. Goodman

[57] ABSTRACT

Method of transmitting picture data from a transmitter to a selected receiver. The picture data to be transmitted are split up into specific picture data intended for an individual receiver and common picture data intended for a plurality of receivers. The common picture data is stored in each receiver and the specific picture data is transmitted via a transmission medium. In the receiver, the specific and common picture data are combined to form a combined picture for display on a display screen. In a further embodiment, the common picture data is transmitted via a further medium, for example teletext.

6 Claims, 5 Drawing Sheets

METHOD OF TRANSMITTING PICTURE DATA FROM A TRANSMITTER TO A SELECTED RECEIVER

FIELD OF THE INVENTION

The invention relates to a method of transmitting picture data from a transmitter to a selected receiver. The invention also relates to a transmitter and a receiver in which the method is used.

BACKGROUND OF THE INVENTION

A known method of transmitting picture data is described in U.S. Pat. No. 4,829,569. In this known method the picture data is constituted by teletext pages. The pages are scrambled in such a way that they can only be received by the selected receiver.

Use of the known method is limited to situations in which the quantity of picture data to be transmitted fits within the capacity of the transmission medium. Problems arise if the capacity is inadequate to frequently provide a plurality of receivers with new picture data. An example of a transmission medium which does not have the required capacity is the mains. Nowadays, the mains is not only used for distributing electric energy, but also for remote control of street lighting, boilers and the like, and for remote reading of electricity meters. To control the consumption of electricity, an ever-increasing number of electricity producers resorts to remote reading of the electric power in individual houses and to adapting the tariffs or controlling a limiter circuit in dependence upon these tariffs. Such measures are expected to be acceptable and to function correctly only if the individual user is clearly informed about the actual state and the possible consequences of his consumer behaviour. However, it has been found that the channel bit rate of the mains is insufficient for providing each house often enough with the data for forming a picture representing the relevant information in a clear way.

OBJECT AND SUMMARY OF THE INVENTION

It is an object of the invention to provide a method which, also at relatively low channel bit rates of a transmission medium, enables picture data to be transmitted to a plurality of selected receivers for display on a display screen.

According to the invention, the method is therefore characterized in that the picture data are split up into common picture data for storage in a plurality of receivers and specific picture data for transmission to the selected receiver, in that the common picture data are stored in the plurality of receivers, and in that the specific picture data are transmitted from the transmitter to the selected receiver via a transmission medium. In the receiver, both types of picture data are subsequently combined to one picture for display on a display screen.

The invention is based on the recognition that the picture to be displayed is largely common for a plurality of selected receivers. By splitting up the common picture data and storing them in all receivers, the medium for transmitting the specific data is no longer burdened with the transmission of common data. In the receiver, the two picture data are combined to one combined picture, as if this picture were transmitted via one medium to the relevant individual receiver.

The specific picture data may be transmitted, inter alia, via the power distribution network. Although the channel bit rate of this medium is limited, it appears to be sufficient for selectively transmitting specific numerical information such as maximum load and the like to individual receivers. The common picture data already stored represents the picture or framework within which the specific information is locally "filled in". Thus, the information can be presented to the user in a readable, convenient, clear and possibly attractive form. Since the common picture has already been stored in the receiver, the transmission medium is not burdened with its transmission.

The information is preferably displayed on a standard television receiver. Such a receiver is already present in every house so that the user can consult the information in his living-room without having to go to the electricity meter.

The common picture data may be preprogrammed in the receiver. The data may be stored in an exchangeable memory circuit or in a reprogrammable memory so that a modification of the common picture may be carded out by, for example a service mechanic. A practical embodiment of the method provides for the transmission of the common picture data from the transmitter to the plurality of receivers via a further transmission medium. In this way, the common picture data is downloaded from the transmitter into the receiver. Thus, the way in which the information is presented by the receiver can be modified by the transmitter, if desired.

In a further embodiment the further transmission medium is constituted by the teletext signal of a television transmitter. This embodiment is attractive because substantially all houses are provided with the infrastructure for receiving teletext signals. Moreover, teletext decoders are commercially available and relatively inexpensive. They have also the required facilities for storing and displaying picture data so that their coupling to the display screen does not require any additional character generator or the like.

DETAILED DESCRIPTION OF THE PREFERRED EMBODIMENTS

Figure 1:
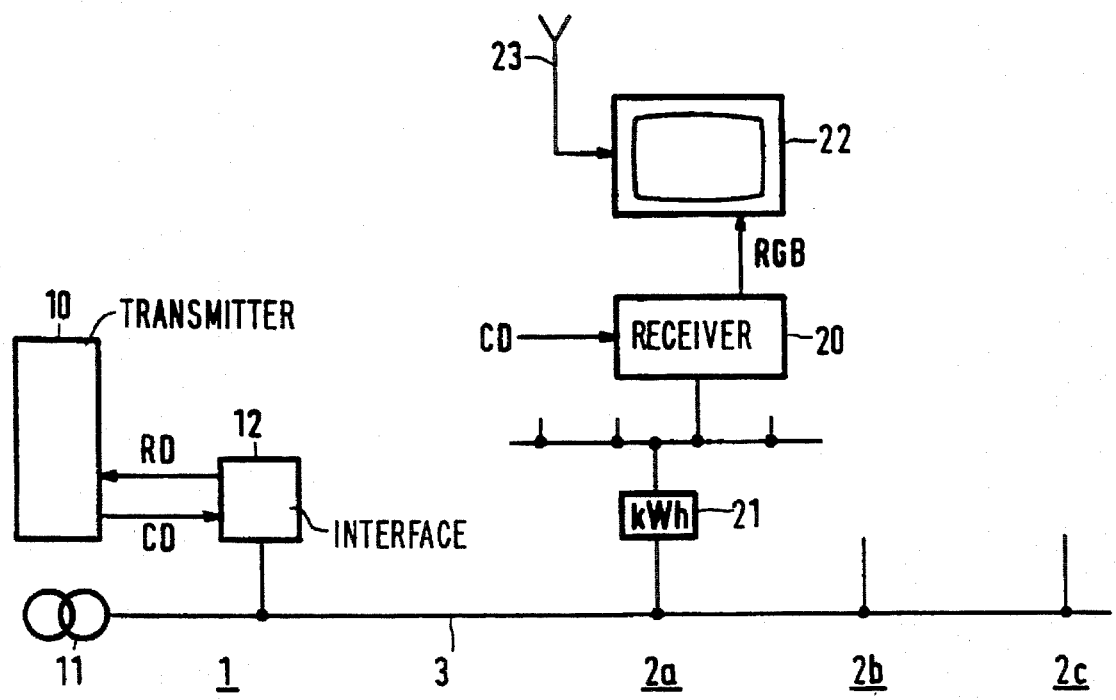
FIG. 1 shows diagrammatically a system in which the method according to the invention is used.

To explain the method according to the invention, its use in a power distribution network will be described. FIG. 1 shows such a network in a diagrammatic form. It comprises a power station 1 provided with a generator 11 which generates electric energy and distributes this energy to a plurality of houses 2a–2c via a power cable 3 (hereinafter referred to as mains). Data are also transmitted via the mains 3 from the power station to individual houses, and vice versa. This bidirectional transmission of data is known under the name of powerline communication and described in CENELEC standard EN 50.065-1. The data are transmitted by a transmitter 10 which is coupled to the mains by means of a powerline data interface 12. The data comprise specific picture data SD from the transmitter to individual houses and return data RD from individual houses to the power station.

As has been shown in greater detail for house 2a, each house has an electricity meter 21 from which the electric energy within the house is distributed to a plurality of connections. A receiver 20 is coupled to the mains 3 via one of these connections. The receiver supplies a picture signal RGB which is presented to a television set 22 in the house.

Figure 2:
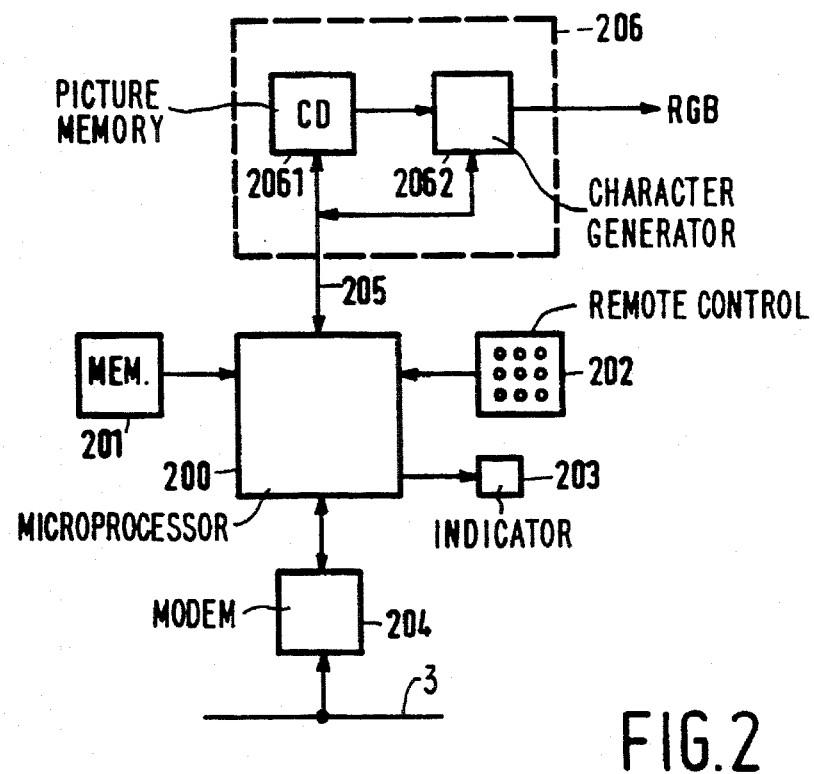
FIG. 2 shows the structure of a receiver shown in FIG. 1.

FIG. 2 shows the structure of the receiver 20 in greater detail. It comprises a microprocessor 200 which is coupled in generally known manner to a memory 201 and an operating panel 202 which, if desired, may be a remote control unit. The microprocessor also controls an indicator 203, for example a bleeper or a light signal indicator.

The microprocessor is further coupled to a powerline modem 204 which is connected to the mains. The modem is adapted to transmit and receive picture data via the mains. The powerline modem is generally known and commercially available under the type number ST7536 of SGS-Thomson. The microprocessor is further coupled to a picture display generator 206 via a bidirectional communication bus 205. This known generator comprises a picture memory 2061 and a character generator 2062. The picture memory 2061 is provided with common picture data CD based on specifications supplied by the power station.

Figure 3A:
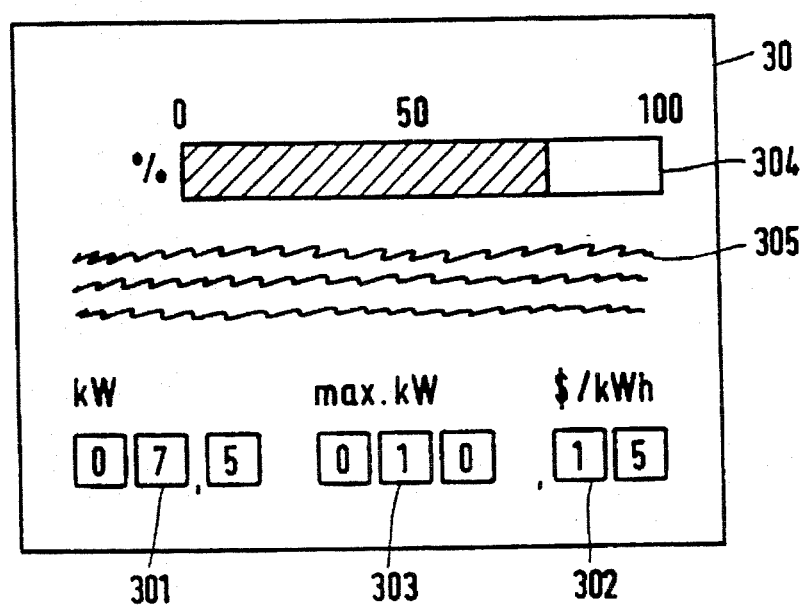
FIGS. 3A–3C show examples of common and specific picture data to explain the method.

The transmission of a picture from transmitter 10 to receiver 20 for display on a television set 22 (see FIG. 1) will now be described by way of example. FIG. 3A shows the picture 30 to be transmitted. It shows the user a survey of the electric power 301 currently supplied to his house, the present tariff 302 and the maximally allowed power 303 for this tariff. A scale 304 shows in a conveniently graphic way which percentage of the maximum power is now being supplied to the house. An additional text 305 provides further information about the possible consequences of exceeding the maximum power (such as raising the tariff or interruption of the current supply).

Figure 3B:
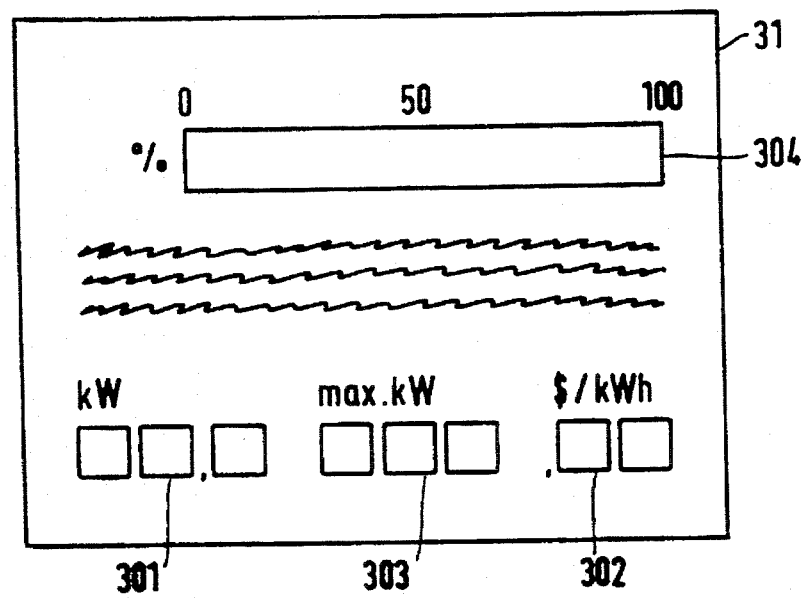
Figure 3C:
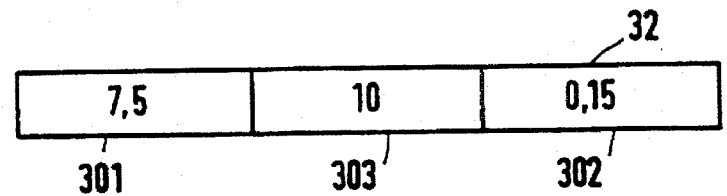

As has been attempted to show by way of FIGS. 3B and 3C, the picture 30 is considered to be composed of a template or "preprinted form" 31 (FIG. 3B) with blank spaces intended to be further filled in, and of the numerical information 32 (FIG. 3C) for filling in the form. The blank form 31 will hereinafter be considered as the common picture data for display in each house. It has been stored in memory 2061 of the receiver (see FIG. 2). However, the numerical information 32 constitutes specific picture data which may differ from house to house. Some numerical information, such as the power 301 being currently consumed, may be supplied by the local electricity meter. Other information, such as the maximum connection power 303 and the tariff 302, are transmitted by the power station to the individual houses via the mains.

Figure 4:
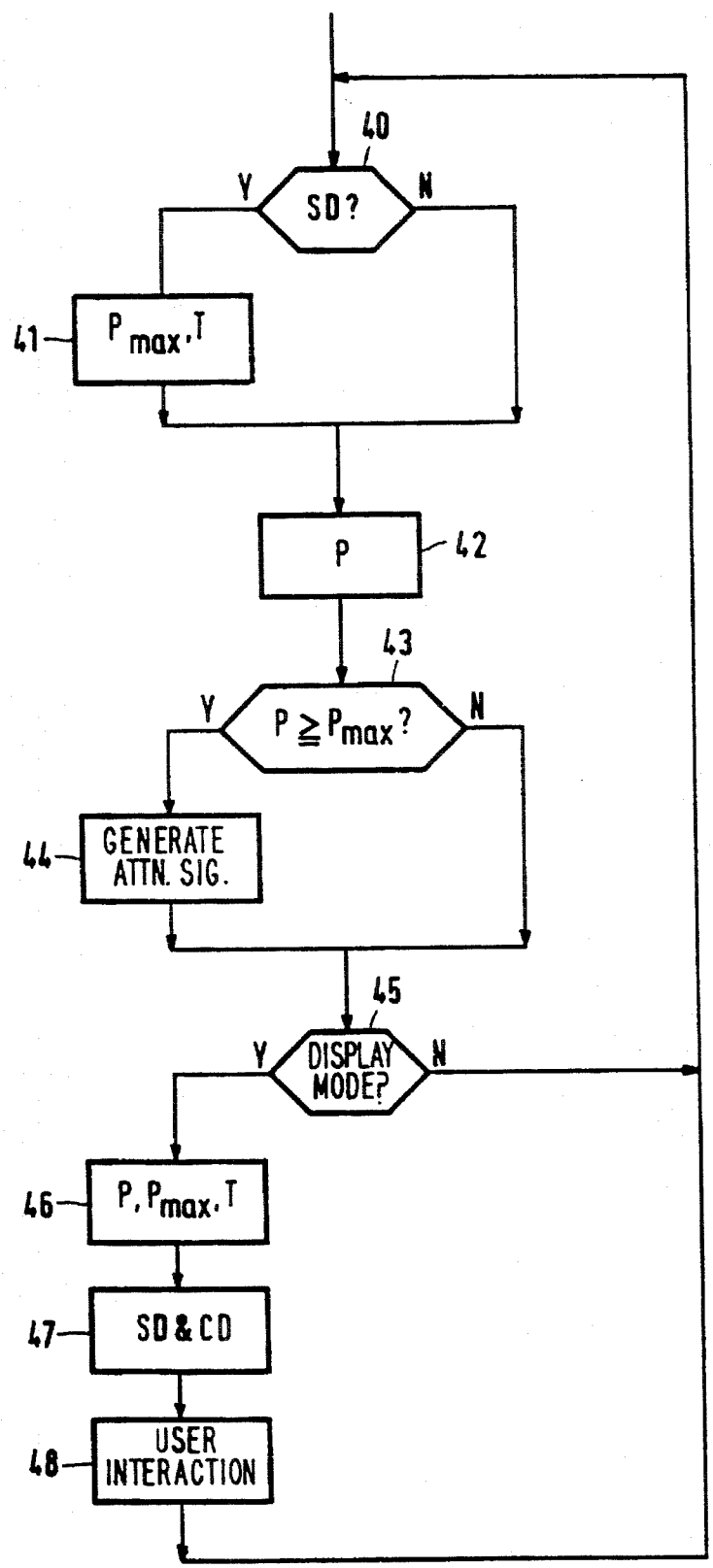
FIG. 4 shows a flow chart of the method performed by the receiver of FIG. 2.

The operation of the receiver shown in FIG. 2 is controlled by a control program executed by microprocessor 200 and stored in memory 201. An embodiment thereof will be described in greater detail with reference to a flow chart which is shown in FIG. 4. In a step 40, the control program checks whether specific picture data SD have been received via the powerline modem. As already stated hereinbefore, these specific picture data comprise the numerical information on maximum consumption and tariff. If picture data have been received, a step 41 is performed in which the relevant information is stored at memory locations $P_{max}$ and T. In a step 42, the electricity meter is read also via the powerline modem so as to obtain the supplied power. The picture data obtained is stored at a memory location P.

In a step 43, the control program compares the present current consumption P with the maximally allowed value $P_{max}$. When the maximum power is reached or exceeded in the house, an attention signal is generated in a step 44. Said attention signal is made audible or visible by means of the indicator 203. If the user does not take any action, he may run the risk that the power station cuts off the current supply. Either or not in response to the attention signal, the user can set the receiver in a display mode. In a step 45, it is checked whether the receiver is in this display mode. If this is not the case, the control program returns to step 40. While the receiver is performing the steps 40–45 in the loop, the user can use his television set at will.

If the receiver is in the display mode, the specific data such as the maximum power $P_{max}$ and the tariff T (which have been received in step 41) as well as the present current consumption P (which has been received in step 42) are filled in on the form. In a step 46, the microprocessor writes the numerical dam P, $P_{max}$ and T at those memory locations of memory 2061 (see FIG. 2) which correspond to the positions denoted by 301–303 in FIG. 3B. Moreover, the microprocessor computes the percentage of $P_{max}$ to which the present current consumption corresponds and shows this graphically on the scale denoted by the reference numeral 304 in FIG. 3B. In a step 47, the page thus formed (in which common and specific picture data have now been combined) is displayed on the screen of the television set by applying it to character generator 2062 (see FIG. 2). The user can now estimate, for example, that the maximum consumption will be exceeded when he switches on the dishwasher while the washing machine has not yet finished.

In a step 48 of the control program there is an interaction, if desired, between the user and the power station. The user can then choose, for example a higher maximum power under a penalty of a higher tariff. The control program subsequently returns to step 40 in order to receive the new data and to refresh the display screen.

Figure 5:
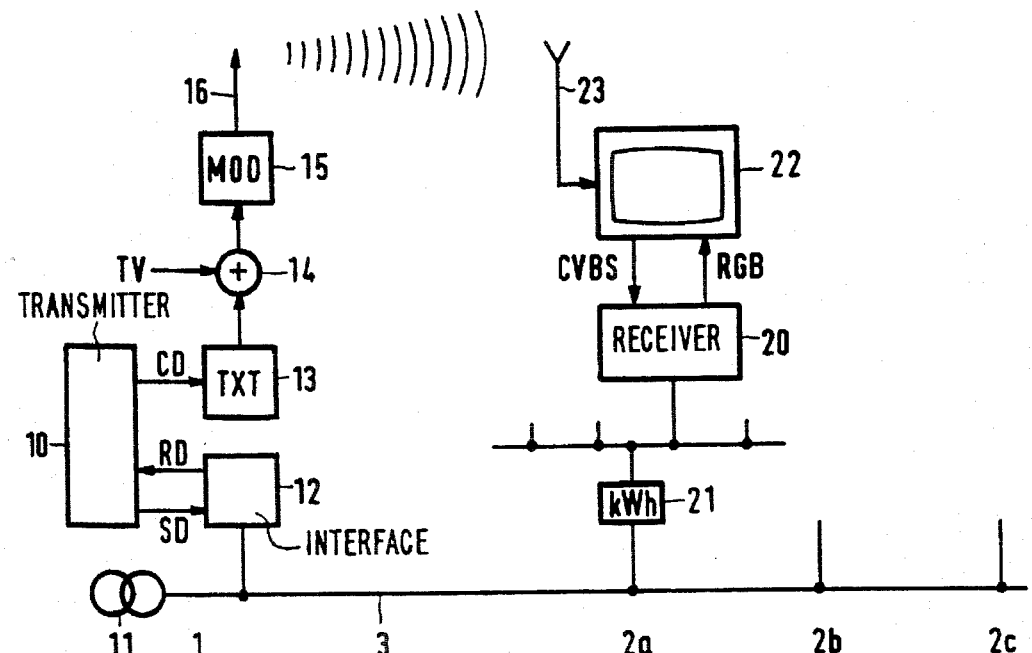
FIG. 5 shows diagrammatically a system in which a preferred embodiment of the method according to the invention is used.

FIG. 5 shows a system in which a preferred embodiment of the method according to the invention is used. In this Figure identical reference numerals have the same significance as in FIG. 1. In this embodiment the transmitter 10 is coupled to a teletext encoder 13 for transmitting the common picture data to the plurality of houses. The teletext encoder supplies a teletext signal which is combined with a television signal in a combination circuit 14 and is transmitted to the houses 2a–2c by means of a modulator 15 and an antenna 16. In this embodiment, the receiver 20 is adapted to receive the television signal from transmitter 10 via antenna 23 and television set 22.

Figure 6:
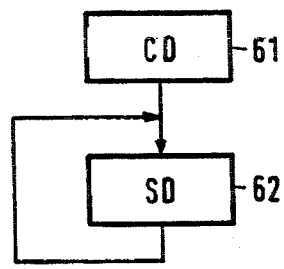
FIG. 6 shows a flow chart of the method which is performed by a transmitter shown in FIG. 5.

The method performed by transmitter 10 will now be explained with reference to a flow chart which is shown in FIG. 6. In a first step 61, the common picture data CD, i.e. the blank form is composed and applied as a teletext page to teletext encoder 13. The teletext page, for example page 800, is subsequently transmitted cyclically by the encoder in known manner. In a further step 62, the specific picture data SD, i.e. the relevant numerical information such as tariff and maximum connection power, is transmitted to individual houses via the mains. Step 62 is performed separately for each house and is repeated as soon as the numerical information is to be refreshed.

Figure 7:
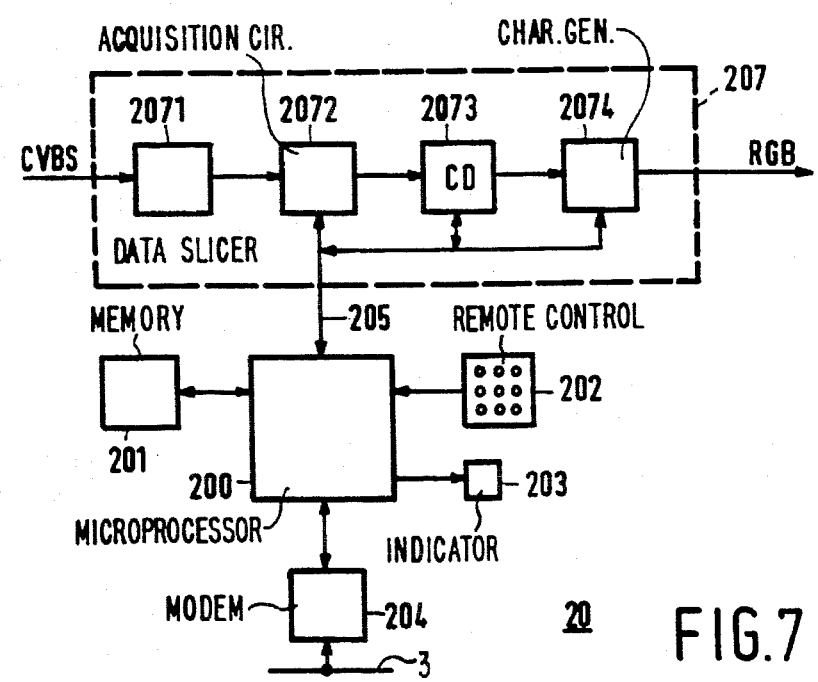
FIG. 7 shows the structure of a receiver shown in FIG. 5.

FIG. 7 shows the structure of receiver 20. It is distinguished from the previously described embodiment in that it comprises a teletext decoder 207. The teletext decoder is commercially available as integrated circuit SAA5246 of Philips and comprises a dam slicer 2071, an acquisition circuit 2072, a memory 2073 and a character generator 2074. The teletext decoder receives a composite video signal CVBS from the television set 22 (see FIG. 5) and is adapted in known manner to acquire and store teletext pages. The pages are displayed by applying the output signal RGB from the character generator to the television set. Via the communication bus 205, the microprocessor 200 can apply the desired teletext page numbers to the acquisition circuit 2072, read and write memory 2073 and select stored pages for display by character generator 2074. By writing memory 2073, the microprocessor is also capable of adding picture data received via the mains to a teletext page for the purpose of combined display on the television display screen.

Figure 8:
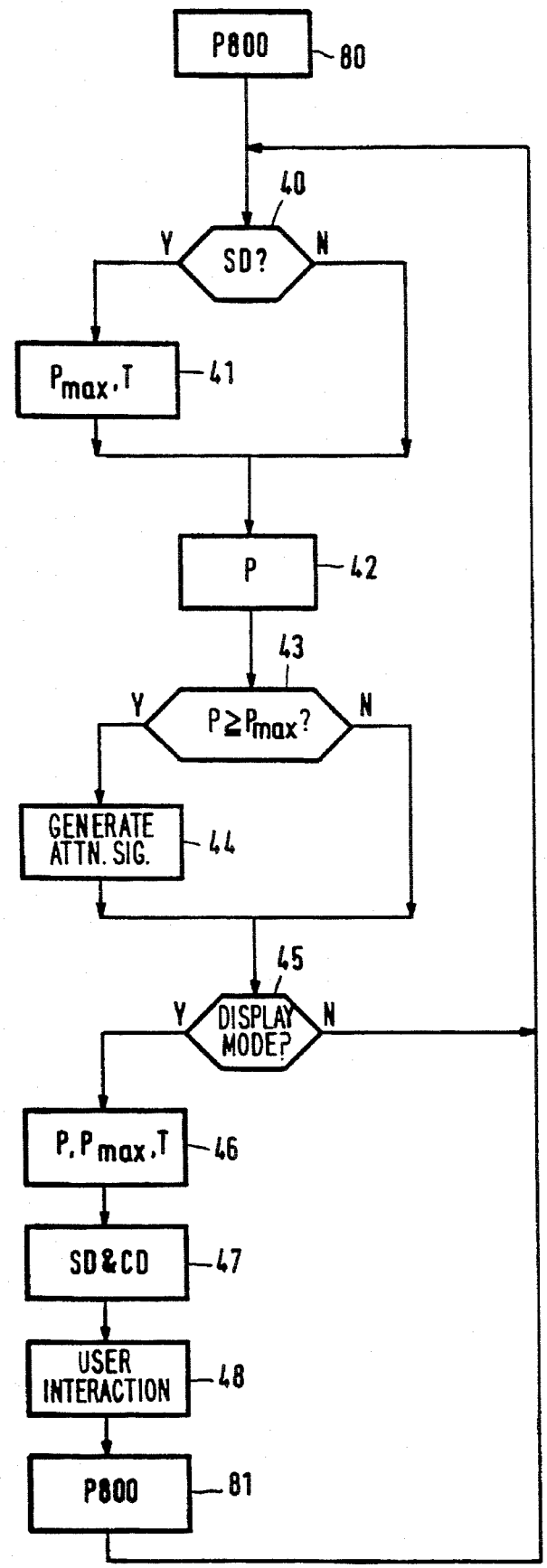
FIG. 8 shows a flow chart of the method performed by the receiver shown in FIG. 6.

FIG. 8 shows the flow chart of the control program which is performed by the receiver shown in FIG. 6. In an initiating step 80 of the program, teletext page 800 is requested and, upon reception, stored in the memory of teletext decoder 206. In this case the television set is considered to be tuned to the TV channel which is allocated to transmitter 10. As already explained hereinbefore, page 800 comprises the common picture data, i.e. the fill-in form shown in FIG. 3B. Subsequently, the control program proceeds through the loop of steps 40–45 which have been explained with reference to FIG. 4. In these steps, the specific picture data $P_{max}$, T and P are received and stored and the present current consumption P is compared with the maximally allowed value $P_{max}$. While the receiver is performing these steps, the user can use his television set at will.

If the receiver is in the display mode, the steps 46 and 47 already described are performed, in which steps the picture to be presented is formed and displayed, and the step 48 is performed in which, if desired, there is interaction between the user and the power station. In a step 81 teletext page 800 is requested and stored so that possible modifications of the common picture data SD are stored in the receiver. In this case the television set is considered to be tuned to transmitter 10.

Avoiding peaks and dips in current supply has many advantages as regards the required capacity and fuel consumption of power stations and as regards environmental pollution. Control of the maximum power and adaptation of the tariffs for each house provides the desired management of these aspects. However, the required cooperation is only obtained from the user if his individual consumption and consequences of a high consumption are presented in a convenient and clear way. The method according to the invention does not only provide for the transmission of specific numerical information to the users, but also for the transmission of large quantities of common picture data which are necessary for the desired form of presentation.

What is claimed is:

1. A method of transmitting power consumption information in the form of picture data from a power station to a selected receiver in a plurality of receivers, comprising the steps of:

splitting up the picture data into common picture data for transmission and storage in the plurality of receivers, and specific data for transmission to the selected receiver;

transmitting, at least when modified, the common picture data to the plurality of receivers via a first transmission medium;

storing the common picture data in the plurality of receivers;

transmitting the specific picture data from the transmitter to the selected receiver via a second transmission medium different from said first transmission medium;

combining the received specific picture data with the stored common picture data in the selected receiver to form a combined picture for display on a display screen.

2. A method as claimed in claim 1, characterized in that the second transmission medium is a power distribution network.

3. A method as claimed in claim 1, characterized in that the first transmission medium is a standard television broadcast carrier, in which the common picture data is transmitted as a teletext signal by a television transmitter.

4. A method as claimed in claim 2, characterized in that the first transmission medium is a standard television broadcast carrier, in which the common picture data is transmitted as a teletext signal by a television transmitter.

5. A receiver for receiving and displaying picture data split up into common picture data for a plurality of receivers and specific picture data for said receiver, comprising:

first receiving means for receiving the common picture data via a first transmission medium;

means for storing the common picture data;

second receiving means for receiving the specific picture data via a second transmission medium, different from said first transmission medium; and combination means for combining the stored common picture data with the specific picture data to form a combined picture for display on a display screen, wherein the second receiving means comprises a data interface circuit interfacing with a power distribution network.

6. A receiver as claimed in claim 5, characterized in that the first receiving means comprises a teletext decoder coupled to a standard television broadcast receiver.

* * * * *